United States Patent

[11] 3,624,212

[72] Inventor Claude Hennart
 St. Denis, France
[21] Appl. No. 598,961
[22] Filed Dec. 5, 1966
[45] Patented Nov. 30, 1971
[73] Assignee Dynachim S.A.R.L.
 Paris, France
[32] Priorities Dec. 6, 1965
[33] France
[31] 40992;
 Dec. 6, 1965, France, No. 40993; Dec. 6, 1965, France, No. 40994; Dec. 6, 1965, France, No. 40995; Mar. 28, 1966, France, No. 55296; Apr. 4, 1966, France, No. 56240; Apr. 29, 1966, France, No. 59805; May 2, 1966, France, No. 59954; May 2, 1966, France, No. 59960; June 9, 1966, France, No. 64916; June 10, 1966, France, No. 65139; Oct. 6, 1966, France, No. 79874; Oct. 21, 1966, France, No. 81147

[54] METHOD OF CONTROLLING FUNGUS WITH SUBSTITUTED BENZIMIDAZOLES AND SUBSTITUTED SULPHENYLISATINS
 4 Claims, No Drawings

[52] U.S. Cl. .................................................. 424/273,
 424/247, 424/248, 424/269, 424/274
[51] Int. Cl. ..................................................... A01n 9/22
[50] Field of Search........................................... 424/273,
 274; 260/326 S, 326.3, 325

[56] References Cited
 UNITED STATES PATENTS

| | | | |
|---|---|---|---|
| 3,097,132 | 7/1963 | Wiegand et al. ............... | 424/273 |
| 3,161,495 | 12/1964 | Miller............................ | 260/309.2 |
| 3,235,559 | 2/1966 | Blocher et al.................. | 260/309.2 |
| 3,369,027 | 2/1968 | Klauke ......................... | 260/309.2 |

*Primary Examiner*—Albert T. Meyers
*Assistant Examiner*—Norman A. Drezin
*Attorney*—Jacobs and Jacobs

ABSTRACT: Substituted sulphenylbenzimidazoles and substituted sulphenylisatins are useful in controlling fungi.

METHOD OF CONTROLLING FUNGUS WITH SUBSTITUTED BENZIMIDAZOLES AND SUBSTITUTED SULPHENYLISATINS

The sulphenic compounds, more especially those derived from a perchloromethylmercaptan, have been the object of numerous researches in the course of the last 20 years. However, none of the compounds studied has ever been able to excel, in several fields at once, the sulphenic products actually on the market, such as "Captane" in their antifungal applications.

The present invention envisages some new sulphenic compounds for which antifungal activities have been shown, in general remarkable and often more marked than those of the products cited above. It is thus, specifically, in the application of a certain number of compounds of the invention for the protection of crops against mildews, results from three to 25 times better than those obtained with "Captane" have been recorded. In the protection of gathered fruits (peaches, oranges, lemons, etc.) against rotting and mould, the results have been in general much more interesting.

The antiparasitic properties of the compounds have in addition the advantage of being generally spread over a large spectrum allowing of their application in the most diverse fields.

The compounds of the invention are heterocyclic systems derived from benzazoles and benzazines carrying a halogeno-alcane-sulphenyl radical on their active nitrogen heteroatom; they correspond to the following general formula:

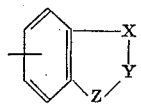

In this formula the benzene nucleus condensed on the heterocycle can have one or more hydrogen atoms replaced by one or some halogens and/or one or some nitro groups and/or one or some alcoxy groups and/or one or some alkyl residues and/or one or some trifluoromethyl residues.

X and Y can each be an atom of nitrogen, Z being a group = N.S.A. in which A is a methyl residue having its hydrogen atoms replaced by any halogens, alike or different, or an ethyl or vinyl residue of which two atoms of hydrogen or more, are replaced by any halogens like or different. The compounds thus formed are benzotriazoles according to the following general formula:

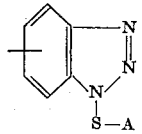

in which the benzene nucleus condensed on the triazole ring carries at least one of the aforementioned elements and/or radicals.

X and Y can each be an atom of nitrogen, Z being a bond — CO N.S.A. group in which A is as previously defined. The compounds thus formed are benzotriazine-1,2,3-one-4 according to the general formula:

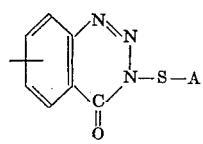

in which the benzene nucleus condensed on the triazine ring carries facultatively the aforementioned element or elements and/or radicals.

X and Y can be respectively a=C—R' group and a=C—R'', Z being a=N.S.A. group in which A is as it has been previously defined. The compounds thus formed are indoles according to the following general formula:

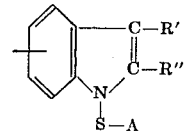

in which the benzene nucleus condensed on the pyrrole ring carries facultatively the aforementioned element or elements and/or radicals, R' and R'' being capable of being like or different and each representing an atom of hydrogen or an alkyl, aralkyl or aryl residue and a cyano or cyanoalkyl group.

X and Y can each be a=CO group the bond between X and Y being simple and Z being a=N.S.A. group in which A is as previously defined to the exclusion however of the possibility of being a dichlorofluoromethyl residue. The compounds thus formed are isatins according to the following general formula:

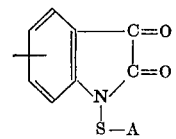

in which the benzene nucleus condensed on the pyrroledione carries facultatively the aforementioned element or elements and/or radicals.

X and Y can be respectively a = C=CH—R''' and a = CO group, the bond between X and Y being simple, R''' being a phenyl, furyl or thienyl residue of which one or more hydrogen atoms can be replaced by one or some halogens and/or one or some nitro groups and/or one or some alcoxy groups and/or one or some alkyl residues, and Z being a = N.S.A. group in which A is as previously defined. The compounds thus formed are indolinones-2 according to the following general formula:

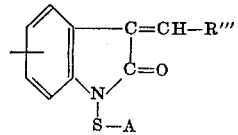

in which the benzene nucleus condensed on the purrolone ring carries facultatively the aforementioned element or elements and/or radicals.

X can be an atom of sulphur or of oxygen and Z a=N.S.A. group in which A as is previously defined, Y being an orthophenylene radical. The compounds thus formed are phenothiazines or phenoxazines according to the following general formulas:

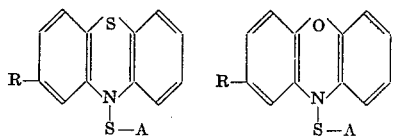

in which R represents an atom of hydrogen or one of the aforementioned elements or radicals.

X can be an atom of nitrogen and a=N.S.A. group in which A is as previously defined, Y being a≅C—R'ᵛ in which R'ᵛ is an atom of hydrogen or one of the following groups:
   an alkyl, aralkyl or aryl residue able to have one or more of its hydrogen atoms replaced by one or some halogens and/or one or some nitro, alcoxy and/or alkylmercapto a pyridine, furan, thiophen, pyrrole, thiazole, isothiazole or thiadiazole joined by one of its carbon atoms directly or by the intermediary of a saturated hydrocarbon group containing one to four carbon atoms in a straight or branched chain, the heterocyclic nucleus $R^{IV}$ capable of having one or several of its hydrogen atoms replaced by one or some halogens and/or one or some nitro groups and/or one or some alkyl, aralkyl and/or aryl residues.

an oxymethyl residue (Quinolyl-8) in which the quinoline can have one or more of its hydrogen atoms replaced by one of some halogens and/or one or some nitro groups and/or one or some alkyl residues.

The compounds thus formed are benzimidazoles according to the following general formula:

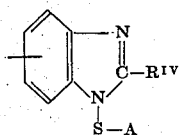

in which the benzene nucleus condensed on the imidazole ring carries facultatively the aforementioned element or elements and/or radicals.

The compounds of the invention can also be bis-benzimidazoles according to the following general formula:

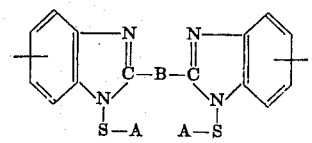

in which the benzene nuclei condensed on the imidazole rings carry facultatively and symmetrically or not, the aforesaid element or elements and/or radicals, A being as has already been defined and B being a saturated straight chain or branch hydrocarbon group and containing one to 10 carbon atoms, or a —CH=CH— ethylene group or a benzene, piridine or furan group attached by any two of its carbon atoms. These same compounds in which one of the two =N.S.A. groups is replaced by a =NH group, are likewise envisaged.

The compounds in which a hydrocarbon nucleus is condensed with two pyrroldione rings according to the following general formula

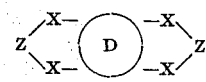

in which X represents a=CO group, Z being a=N.S.A. group in which A is as previously defined and Z' being a=N.S.A. group and a=NH group, are likewise envisaged.

The D nucleus can be a benzene, the compounds thus formed being derivatives of pyrrolo-3,4-c isoindole or pyrrolo-3,4-f isoindole according to the following general formulas

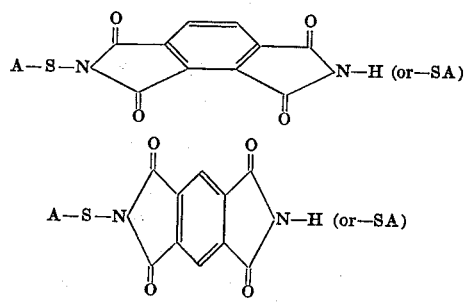

in which the benzene nucleus condensed on the pyrroledione rings carries facultatively one or two halogens. The D nucleus can be a cyclohexane, the compounds thus formed being hexahydro derivatives of the preceding compounds and being represented by the following general formulas:

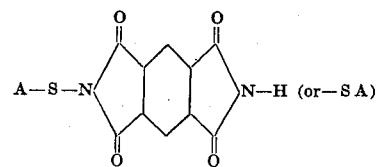

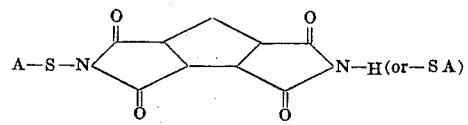

The D nucleus can be a cyclopentane, the compounds thus formed being lower homologues of the preceding compounds and being represented by the following general formula:

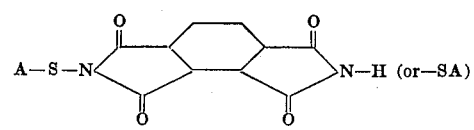

The products of the invention are antiparasitic agents, very efficacious against many harmful living organisms; their degree and their spectrum of activity are of course variable from one product to the other but in a general way their antiparasitic properties allow of their use in the fight against harmful living organisms as follows;

1. Fungi parasitic on plants, on their seeds or their fruits such as, for example, species of *Alternaria, Botrytis, Cercospora, Dipoodia, Fusarium, Monilinia, Neofabrea, Penicillium, Phytophthora, Pythium, Rhizoctonia, Septoria, Glomerella*, etc.
2. The fungi responsible for human and animal diseases (aspergilloses, cryptococcoses, epidermophytes, microsporon, pityriasis, trichophytes, etc.)
3. Saprophytic fungi responsible for breaking down wood, leather, textiles, paintings, paper and other materials.
4. Fungi attacking food products.

A certain number of the products of the invention, more particularly those carrying an aryl or heterocyclic residue at the 2-position, possess antihelminthic properties allowing of their use against, for example, Anguillula, Ascarids, Trichina, Ankylostoma, Eustrongylus, etc.

Some products of the invention possess, in addition, antibacterial, nematocidal, herbicidal, insecticidal and/or insectifuge properties.

The invention envisages the use of the said products having regard to the applications deriving from the properties mentioned above.

In the agricultural field the invention envisages more especially the applications here following, without, however, their being able to be considered as limiting:

The use of the compounds defined above for protection against fungi, of standing plants and their products such as fruits, tubers, seed, roots, leaves, etc.

The invention likewise envisages the use of the said compounds for the protection against fungi, of agricultural products after harvesting until the moment of their consumption.

The use of the said compounds for the disinfection and preservation of edible seeds and of seeds for propagation;

The use of the said compounds for the protection of seeds for propagation in the earth and of seedlings resulting therefrom;

The use of the said compounds as growth factors in germination and the development of plants.

Among the agricultural products able to be protected against fungal infection may be cited by way of nonlimiting example oranges, lemons, mandarins, grapefruit, pears, apples, apricots, peaches, plums, avocados, bananas, pineapples, tomatoes, celery, watermelons, cucumbers, pumpkins, eggplants, marrows, strawberries, cherries, onions, garlic, peppers, turnips, potatoes, artichokes, asparagus, etc.

Among the edible grains and seeds for propagation able to be disinfected and effectively protected according to the invention, may be cited by way of nonlimiting examples, wheat, oats rye, maize, barley, beans, peas, lentils, rice, broad beans, and the seeds of celery, melon, tomato, beetroot, cucumber, eggplant, pumpkin, potato, flax, rape, etc.

The examples which follow indicate in a manner in no way limiting some of the antifungal activities of the compounds of the invention.

The following abbreviations are used to designate the compounds tested:

A = Trichloromethane-sulphenylbenzimidazole
B = Nitro-6-trichloromethane-sulphenylbenzimidazole
C = ethyl-2-trichloromethane-sulphenylbenzimidazole
D = (furyl-2)-2-trichloromethane-sulphenylbenzimidazole
E = (thiazolyl-4)-2-trichloromethane-sulphenylbenzimidazole
F = (thiazolyl-4)-methyl-2-trichloromethane-sulphenylbenzimidazole
G = Trichloromethane-sulphenylisatin The following compounds have been used as reference substances:

CAPTAN: Trichloromethane-sulphenyl-tetrahydrophtalimide
FURIDAZOLE: (furyl-2)-2-benzimidazole
THIABENDAZOLE: (thiazolyl-4)-2-benzimidazole
MANEBE: Manganese ethylen-bis(dithiocarbamate)

1. Primary tests for inhibition of germination on various stocks

The compound under study is mixed with a dextrose potato agar at various concentrations and the mixture is put into Petri dishes; one allows to set then inoculates with the micro-organism; One notes the presence of growth if any after 72 hours; the following table uses the following classifications:

0 = growth at a concentration of 500 p.p.m.;
1 = inhibition between 100 and 500 p.p.m.;
2 = inhibition between 20 and 100 p.p.m.;
3 = inhibition at 20 p.p.m.;

| compound | A | D | E | Captan |
|---|---|---|---|---|
| Organism | | | | |
| Dieghtonella turulosa | 1 | 3 | 3 | 1 |
| Fusarium oxysporum | 1 | 2 | 3 | 2 |
| Fusarium roseum | 1 | 2 | 3 | 2 |
| Gleosporium musarium | 1 | 2 | 3 | 2 |
| Gleosporium perennaus | 1 | 3 | 3 | 2 |
| Glomerella cingulata | 0 | 1 | 1 | 0 |
| Monilinia fructicola | 2 | 3 | 3 | 3 |
| Penicillium expansum | 0 | 1 | 2 | 2 |
| Rhizoctonia solani | 2 | 2 | 3 | 1 |
| Stemphylium sacrinaeforme | 1 | 1 | 1 | 2 |
| Thielaviopsis paradoxa | 2 | 3 | 3 | 3 |

The following further tests were effected in the same way as described above but with different concentrations; the results are classified as follows:

2 = inhibition at a concentration of 50 p.p.m.;
3 = inhibition at a concentration of 20 to 25 p.p.m.;
4 = inhibition at a concentration of 10 to 12 p.p.m.;
5 = inhibition at a concentration of 5 p.p.m.;

| Compound | A | D | E |
|---|---|---|---|
| Organism | | | |
| Alternaria solani | 2 | 2 | 4 |
| Curvularia Verruculosa | 3 | 3 | 3 |
| Gleosporium fructigenes | 4 | 3 | 5 |
| Monilinia lara | 4 | 4 | 4 |

2. Inhibition of the mycelium of various organisms

The following concentrations have been shown to be able completely to inhibit the mycelium of the following organism, the concentrations being expressed in the following table as p.p.m.

| compound | D | E | Captan |
|---|---|---|---|
| organism | | | |
| Botrytis cinerea | 8 | 8 | 200 |
| Corticum sasaki | 200 | 8 | 200 |
| Fusarium spp. | 40 | 40 | 200 |
| Piricularia Orizao | 40 | 8 | 40 |
| Rhizoctonia solani | 200 | 8 | |
| Sclerotinia sclerotiorum | 40 | 40 | 40 |

3. Inhibition of the germination of the spores of Alternaria tenuis

One drop of suspension of 50,000 spores/cm.$^2$ is added to a milliliter of emulsion in water of the product under study. Three drops of this preparation are put on a microscope slide and placed in a damp chamber at 20° C. for 16 to 20 hours. One then counts the number of spores germinated and not germinated, and deduces the percentage of inhibition.

| Compound | Concentration in p.p.m. | | | | | |
|---|---|---|---|---|---|---|
| | 300 | 100 | 30 | 10 | 3 | 1 | 0.3 |
| A | — | 100 | — | 90 | 78 | 77 | 31 |
| C | — | — | 98 | 91 | 92 | 37 | — |
| D | — | — | — | 97 | 58 | 17 | 6 |
| E | — | 100 | — | 88 | 84 | 64 | 9 |
| Thiabendazole | 0 | 6 | — | — | — | — | — |
| Furidazole | — | 22 | 13 | 9 | 0 | — | — |
| Maneb | — | — | 89 | 67 | 28 | 5 | — |

4. Inhibition of the germination of the spores of Penicillium digitatum

One operates as in 3; the results are expressed as the number of spores germinated percent compared with those of an untreated control.

| Compound | Concentration in p.p.m. | | | | |
|---|---|---|---|---|---|
| | 5,000 | 500 | 200 | 50 | control |
| D | 0 | 26.3 | 48.0 | 84.1 | 92.6 |
| E | 0 | 0 | 60.5 | 88.2 | Id. |
| G | 0 | 0 | 0 | 83.2 | Id. |
| Captan | 0 | 3.6 | 68.0 | 82.8 | Id. |

5. Inhibition of the germination of the spores of Penicillium italicum

One operates as in 3; the results are expressed as the number of spores germinated percent and compared with those in an untreated control.

| Compound | Concentration in p.p.m. | | | | |
|---|---|---|---|---|---|
| | 5,000 | 500 | 200 | 50 | Control |
| D | 0 | 34.1 | 46.0 | 69.6 | 94.6 |
| E | 0 | 4.5 | 52.1 | 78.3 | Id. |
| F | 0 | 26.1 | 57.3 | 73.8 | Id. |
| G | 0 | 0 | 0 | 43.4 | Id. |
| Captan | 0 | 15.2 | 39.0 | 43.1 | Id. |

6. Inhibition of the germination of piricularia oryzae

One operates as in 3; the results are expressed as the number of spores germinated percent and compared with those of an untreated control.

| Compound | concentration in p.p.m. | | | | Control |
|---|---|---|---|---|---|
| | 5,000 | 500 | 200 | 50 | |
| A (323) | 0 | 8.0 | 77.9 | 88.4 | 97.2 |
| D (325) | 0 | 0.5 | 58.6 | 87.7 | Id. |
| E (322) | 0 | 36.6 | 50.4 | 64.0 | Id. |
| CT (345) | 0 | 0 | 88.8 | 88.9 | Id. |
| Captan | 0 | 33.1 | 91.5 | 92.1 | Id. |

7. Inhibition of the germination of the spores of Helminthosporium

One operates as in 3; the results are expressed as the number of spores germinated percent and compared with those of an untreated control.

| Compound | Concentration in p.p.m. | | | | Control |
|---|---|---|---|---|---|
| | 5,000 | 500 | 200 | 50 | |
| A (323) | 0 | 5.0 | 50.2 | 71.3 | 77.6 |
| D (325) | 0 | 4.3 | 37.1 | 65.2 | Id. |
| E (322) | 0 | 0 | 24.4 | 66.2 | Id. |
| F (327) | 0 | 18.7 | 66.3 | 68.3 | Id. |
| G (345) | 0 | 1.1 | 68.6 | 74.7 | Id. |
| Captan | 0 | 66.8 | 68.3 | 71.2 | Id. |

8. Inhibition of the growth of Botrytis cinerea

Discs of filter paper 9 mm. in diameter impregnated with a suspension in water of the product under study are placed on nutrient media inoculated with the micro-organism. One measures the size of the inhibited area formed around the disc of paper; the results are expressed in tenths of a millimeter.

| Compound | Concentration in p.p.m. | | |
|---|---|---|---|
| | 30 | 10 | 3 |
| A (323) | 60 | 10 | 0 |
| E (322) | 73 | 40 | 0 |
| Captan | 60 | 10 | 0 |

9. Inhibition of the growth of penicillium expansum

One operates as in 8.

| Compound | Concentration in p.p.m. | | |
|---|---|---|---|
| | 30 | 10 | 3 |
| A (323) | 55 | 15 | 0 |
| E (322) | 86 | 63 | 16 |
| Captan | 50 | 19 | 0 |

10. Inhibition of the germination of the spores of Phytophthora infestans on tomato leaves Tomato leaves are treated by spraying with a dispersion in water of the product under study. One then contaminates the leaves, at a known number of points, with a spore-suspension. After incubation the number of spots of disease are counted and one deduces therefrom the percentage of protection.

| Compound | Concentration in p.p.m. | | | | |
|---|---|---|---|---|---|
| | 1,000 | 300 | 100 | 30 | 10 |
| A (323) | 100 | 87 | 47 | — | — |
| C | 100 | 100 | 60 | 54 | 32 |
| D | 100 | 100 | 96 | 88 | 96 |
| E | 100 | — | 87 | 0 | — |
| F | 100 | 100 | 94 | 100 | 47 |
| Captan | — | — | 54 | 40 | 0 |
| Thiabendazole | 72 | — | 56 | — | 4 |
| Furidazole | 100 | 88 | 58 | 36 | 24 |
| Manebe | — | — | 47 | 7 | 0 |

11. Inhibition of the germination of the spores of Monilinia fructicola on gathered peaches Intact peaches are washed then pricked and inoculated with a spore-suspension; the fruits are then treated by spraying with a dispersion at various concentrations of the compound under study; one leaves the fruits in a damp chamber and notes infection at the end of 2 days. The results are classified as follows:

3 = moderate infection
4 = slight infection
5 = no infection

| Compound | Concentration in p.p.m. | |
|---|---|---|
| | 1,000 | 500 |
| D | 5 | 4 |
| E | 5 | 4 |
| Captan | 4 | 3 |

12. Inhibition of the germination of the spores of Podospharea leucotricha on young apple trees The plants are treated with a suspension in water at a concentration of 100 p.p.m. of the compound under study; after natural drying one inoculates with the spores coming from infected plants. At the end of 14 days one notes the percentage of protection with respect to a control.

Compound D = 31 percent
Compound E = 14 percent
Captan = 14 percent

13. Inhibition of the germination of the spores of Erysiphe polygona on kidney bean plants Kidney bean plants are treated with dispersions at various concentrations in water of the compounds under; one allows to dry and inoculates with spores coming from contaminated plants; one notes from 1 (no protection) to 5 (total protection) the recorded results.

| Compound | Concentration in p.p.m. | | | |
|---|---|---|---|---|
| | 500 | 100 | 20 | 4 |
| B | 5 | 3 | 2 | 1 |
| D | 5 | 4 | 3 | 1 |
| E | 5 | 5 | 5 | 2 |
| Captan | 5 | 3 | 2 | 1 |

In another test one operates in the same way using dispersions at a concentration of 50 p.p.m.; at the end of 10 days one notes the percentage of protection.

Compound D = 95 percent
Compound E = 95 percent
Captan = 40 percent

14. Inhibition of the germination of the spores of Colletotrichum lagenarium on cucumber plants One operates as in the first part of example 11 and notes in the same way.

| Compound | Concentration in p.p.m. | | | |
|---|---|---|---|---|
| | 500 | 100 | 20 | 4 |
| B | 5 | 5 | 1 | 1 |
| D | 5 | 5 | 2 | 1 |
| E | 5 | 5 | 4 | 1 |
| Captan | 5 | 5 | 2 | 1 |

In their applications the products of the invention can be used in all the forms, either alone, or combined two or more at a time; they can also be used in the form of liquid, plastic or solid compositions according to the method of use.

A composition can be formed by one or more products of the invention in mixture with one or more inert products and/or one or some products possessing one or some activities similar to or different from those forming the object of the invention.

A liquid composition can be, for example, a solution or a suspension or a dispersion in water or in any appropriate liquid.

A solid composition can be, for example, made in the form of a powder, granules, tablets, agglomerations or doses containing one or other of these forms.

A plastic composition can be, for example, a solution or a suspension or a dispersion in a plastic substance such as a fat, a paraffin wax, a wax, an oil or a resinous and/or adhesive substance; it can form, for example, a liniment, a pommade, a cream, a balm, an ointment or a plaster.

As examples of active products capable of being associated with the compounds recommended by the invention may be mentioned insecticides (heptachlorine, lindane, aldrin, dieldrin, etc.), antibacterials (chloramphenicol, aureomycin, penicillin, streptomycin, etc.), repellents, (diphenylguanidine, anthraquinone, etc.) or other antifungals (Oxin, cuprous Oxinate, bromochloroxin, "zinebe," "manebe," benzene hexachloride, etc.).

The compositions can be used, for example, in sprinklings, waterings, scatterings, irrigations, washings, steepings, atomizations, vaporizations, fumigations, coverings, coatings, pralinages (in mixture with earth and water) etc. carried out manually by instrumental processes motorized or not.

By way of nonlimiting examples, the following compositions may be cited:

A paint or a varnish based on synthetic resins containing one or more products of the invention in order to procure antifungal properties allowing the protection of walls or materials against fungi at the same time as that of stored or transported products.

A solution or an emulsion containing one or some products of the invention and intended for disinfectant and protective treatment of citrous fruits and of fruits in general.

A dry powder containing one or more products of the invention, and intended for the treatment of sowings for the purpose of disinfecting them and ensuring protection of the young plant after germination. Such a powder may contain in addition an insecticide and/or a bird-repellent and/or a raticide and/or another antifungal substance capable of acting synergistically with the products or product of the invention.

A fat compounded or not containing one or some products of the invention intended for soil disinfection and for the treatment or the protection of plants by systemic effect or otherwise.

A liquid containing a propellent such as a fluorinated hydrocarbon and one or several products of the invention, the whole allowing for the creation of disinfectants, insecticidal and/or insectifuge aerosols.

Some examples of the use of the compounds of the invention are given hereafter; these examples are purely illustrative and in no way limit the invention.

1. Composition for the treatment of spotting in fruit trees

One mixes intimately 1 part of one of the recommended compounds with 4 parts of talcum powder and 0.2 parts of a condensate of nonylphenol with eight molecules of ethylene oxide; the powder thus obtained is used in suspension in water at a ratio of 100 to 500 g. per hectoliter.

2. Protection of citrous fruits by washing

The fruits are immersed for a few minutes by means of an endless chain or belt apparatus provided with division plates, in a bath formed by a suspension containing, per liter of water, 0.5 to 2 g. of one of the recommended compounds.

3. Composition for the treatment of mildew

One of the recommended compounds is finely pulverized with its own weight of wettable; earth; one uses the powder thus obtained at a ratio of 150 to 600 g. per hectoliter of water for making up a mixture which is applied by sprinkling.

4. Powder coating of corn

One treats the grains in a powder mixture with a finely pulverized mixture containing 2 to 10 percent of one of the compounds recommended by the invention, in talcum powder or mica; one used 200 to 500 g. of powder per quintal of corn.

5. Treatment of the soil intended for truck crops

One treats the soil with a mixture containing 50 to 100 g. per hectoliter of a mixture containing 15 percent of one of the recommended compounds and 15 percent of quintozene.

6. Pralinage of barley

One treats the grains by pneumatic atomization with an aqueous suspension of one of the recommended compounds at a ratio of 5 to 50 g. of that compound per quintal; one then covers the damp grains with a fine powder formed by a mixture of talcum powder and carbomethoxy-cellulose.

7. Coating of citrous fruits

One operates according to the process known under the name of "Flavorseal" using a solution or a suspension containing 10 to 20 percent of a mixture of wax and coumarone resin and 0.5 to 2 percent of one of the recommended compounds.

8. Coating of citrous fruits

One treats the fruits on a brush conveyor or a foam mat impregnated permanently with an emulsion in water of a mixture of wax and synthetic resin containing 0.5 to 2 percent of one of the recommended compounds.

9. Treatment of celery before harvesting

The plots are sprayed by pneumatic atomization a little before their harvesting with an aqueous suspension containing per liter 0.1 to 0.5 g. of one of the recommended compounds. One uses 150 to 200 liters of this suspension per hectare.

The invention envisages also the fabrication of compositions previously defined. The fabrication process of the invention consists in the action of a sulphenyl halide of the general formula A.S.Q, Q being a halogen and A a residue as has already been defined, on one of the previously defined compounds in which a =NH group takes the place of the desired = N.S.A. group.

The reaction can also be carried out starting from N-metallic derivatives of the said compounds, that is to say starting from the compounds the hydrogen atom of which carried by the nitrogen hetero atom is replaced by a metal such as e.g., sodium, potassium, or silver, or by a mercury halide group.

When one uses a metallic derivative the reaction is effected for preference in a liquid acting as solvent or support, as, for example, water, an aliphatic, alicyclic or aromatic hydrocarbon, an oxygenated heterocyclic compound, an ether oxide, an halogenated hydrocarbon or their mixtures.

It is not indispensable to isolate the metallic derivative and the reaction can also take place in a mixture containing an alkali-metal hydroxide or alkoxide; however the presence of water or of an alcohol can entail the formation of troublesome byproducts; for this reason it is sometimes preferable to eliminate, before reaction, the water or alcohol used in the formation of the metallic derivative or to prepare this by a process not needing the solvents.

One of the preferred methods of the invention consists in causing the sulphenyl halide to act on the heterocyclic compound in solution or in suspension in an inert anhydrous and nonhydroxylated liquid in the presence of an acid acceptor such as, for example, a tertiary amine, a nitrogenated heterocyclic compound or a basic mineral salt (carbonate, borate, etc.). The acid acceptor can be used either in equimolecular quantity, or to excess, or even to form all or part of the liquid acting as solvent or support. The inert liquids mentioned above as examples are suitable in general for operation of the present method of preparation, as well as the conditions of temperature and pressure.

Whatever be the method of preparation used it is generally important to choose the solvent or support liquid in such a way that the metallic halide or the nitrogenated hydrohalide then formed will be insoluble and can be eliminated by filtration, the useful compound remaining alone in solution and being then able to be separated by a known means such as, for example, precipitation or concentration. The salt thus formed can also be eliminated by one or some washings in conditions that avoid hydrolysis of the useful compound, presence of a small proportion of an acid or of a base can sometimes contribute to facilitating the washing or washings and/or to purify the said compound. The washing or washings are preferably carried out in the solution containing the said compound, but it is sometimes possible to operate on that compound in the absence of solvent.

Room temperature often suffices for the reaction but it is sometimes important to use a lower temperature in order to modify the rate thereof or on the contrary a higher temperature to facilitate and/or to complete the operation.

Atmospheric pressure is usually convenient but use can be made of a higher pressure in order to reduce the fabrication period.

The following examples are given with the object of illustrating the processes of fabrication; they do not limit the invention in any way.

EXAMPLE 1

Into 3 liters of dry benzene one introduces successively 184 g. (1 mole) of (furyl-2)-2-benzimidazole in fine powder form and 101 g. (1 mole) of triethylamine; one subjects the whole to a good agitation and introduces, in about 1 hour, 186 g. (1 mole) of perchloromethylmercaptan (trichloromethanesulphenyl chloride); one notes a rise in temperature of 8° C.; one agitates for a further hour then washes the liquid twice with a liter of iced water. One dries on sodium sulfate, filters and evaporates off the benzene under reduced pressure; one washes the residue with cyclohexane and dries in a steam of dry air shielded from light; one obtains trichloromethanesulphenyl-1-(furyl-2)-2-benzimidazole in the form of yellowish-white crystals (m.p. = 105°–106° C., dec.).

Operating in an analogous way one can, in particular, prepare the following compounds:
Trichloromethanesulphenyl-1-(nitro-5-furyl-2)-2-benzimidazole
Trichloromethanesulphenyl-1-(chloro-5-furyl-2)-2-benzimidazole
Trichloromethanesulphenyl-1-(chloro-4-furyl-2)-2-benzimidazole
Trichloromethanesulphenyl-1-(dichloro-3,5-furyl-2)-2-benzimidazole
Trichloromethanesulphenyl-1-(thienyl-2)-2-benzimidazole
Trichloromethanesulphenyl-1-(pyridyl-3)-2-benzimidazole
Trichloromethanesulphenyl-1-(pyridyl-2)-2-benzimidazole
Trichloromethanesulphenyl-1-(pyrryl-2)-2-benzimidazole
Trichloromethanesulphenyl-1-(pyrryl-3)-2-benzimidazole Likewise, by replacing perchloromethylmercaptan with other sulphenyl halides, one can, in particular, prepare the following compounds:
Dichlorofluoromethanesulphenyl-1-(furyl-2)-2-benzimidazole
Chlorodifluoromethanesulphenyl-1-(furyl-2)-2-benzimidazole
(Trichloro-1,2,2-ethanesulphenyl)-1-(furyl-2)-2-benzimidazole
(Tetrachloro-1,1,2,2-ethanesulphenyl)-1-(furyl-2)-2-benzimidazole
(Tetrachloro-1,2,2,2-ethanesulphenyl)-1-(furyl-2)-2-benzimidazole
(Dichloro-1,2-ehtylenesulphenyl)-1-(furyl-2)-2-benzimidazole
(Trichloro-1,2,2-ethylenesulphenyl)-1-(furyl-2)-2-benzimidazole

EXAMPLE 2

Into 2.5 liters of dry benzene one introduces successively 201 g. (1 mole) of (thiazolyl-4)-2-benzimidazole in fine powder form and 101 g. (1 mole) of triethylamine; one subjects the whole to a good agitation and introduces, in about 30 minutes, 186 g. (1 mole) of perchloromethylmercaptan in solution in 500 ml. of benzene; one notes a rise in temperature of 10° C.; one agitates for a further hour then filters the liquid to eliminate the hydrochloride of triethylamine; the benzene is evaporated under reduced pressure and the residue is washed with pentane; one dries in a stream of dry air shielded from light; one obtains trichloromethanesulphenyl-1-(thiazolyl-4)-2-benzimidazole in the form of a white powder with orange reflections (m.p. = 135° C.).

Operating in an analogous way one can, in particular, prepare the following compounds:
Trichloromethanesulphenyl-1-(methyl-2-thiazolyl-4)-2-benzimidazole
Trichloromethanesulphenyl-1-(thiazolyl-2)-2-benzimidazole
Trichloromethanesulphenyl-1-(thiazolyl-5)-2-benzimidazole
Trichloromethanesulphenyl-1-(isothiazolyl-4)-2-benzimidazole
Trichloromethanesulphenyl-1-(methyl-3-isothiazolyl-5)-2-benzimidazole;
Trichloromethanesulphenyl-1-(thiadiazol-1,2,3-yl-4)-2-benzimidazole
Trichloromethanesulphenyl-1-(thiadiazol-1,2,5-yl-3)-2-benzimidazole Likewise by replacing perchloromethylmercaptan by other sulphenyl halides one can, in particular, prepare the following compounds:
Dichloromethanesulphenyl-1-(thiazolyl-4)-2-benzimidazole
Chlorodifluoromethanesulphenyl-1-(thiazolyl-4)-2-benzimidazole
(Trichloro-1,2,2-ethanesulphenyl)-1-(thiazolyl-4)-2-benzimidazole
(Tetrachloro-1,1,2,2-ethanesulphenyl)-1-(thiazolyl-4)-2-benzimidazole
(Tetrachloro-1,2,2,2-ethanesulphenyl)-1-(thiazolyl-4)-2-benzimidazole
(Dichloro-1,2-ethylenesulphenyl)-1-(thiazolyl-4)-2-benzimidazole
(Trichloro-1,2,2-ethylenesulphenyl)-1-(thiazolyl-4)-2-benzimidazole

EXAMPLE 3

Into 5 liters of benzene one introduces successively 215 g. (1 mole) of (thiazolyl-4)-methyl-2-benzimidazole in fine powder form and 101 g. (1 mole) of triethylamine; one cools the whole to about +5° C. and, without exceeding 8° C. and agitating vigorously, one introduces slowly 186 g. (1 mole) of perchloromethylmercaptan in solution in 1 liter of benzene; one agitates for a further hour and maintaining the temperature below 10° C. then filters to eliminate the hydrochloride of triethylamine; one concentrates under reduced pressure, without exceeding 20° C., to a volume of 500 ml. then adds 500 ml. of isopropyl oxide; one suction filters and dries with a stream of dry air the trichloromethanesulphenyl-1-(thiazolyl-4)-methyl-2-benzimidazole which appears in the form of a yellowish powder (m.p. = 106° C., dec.).

Operating in an analogous way one can, in particular, prepare the following compounds:
Trichloromethanesulphenyl-1-(methyl-2-thiazolyl-4)-methyl-2-benzimidazole
Trichloromethanesulphenyl-1-(dimethyl-2,5-thiazolyl-4)methyl-2-benzimidazole
Trichloromethanesulphenyl-1-(pyridyl-2)-methyl-2-benzimidazole
Trichloromethanesulphenyl-1-benzyl-2-benzimidazole Trichloromethanesulphenyl)-1-(thiazolyl-4)-methyl-2-
chloro-5-benzimidazole
Trichloromethanesulphenyl)-1-(thiazolyl-4)-methyl-2-
dichloro-5,6-benzimidazole

EXAMPLE 4

Into 3 liters of cyclohexane one introduces 130 g. (1.1 mole) of benzimidazole in fine powder form; one cools the whole to about 0° C. and, while continuing to cool and agitating, one adds, in about 30 minutes, 186 g. (1 mole) of perchloromethylmercaptan; one then adds, slowly and maintaining the temperature in the region of 0° C., 101 g. (1 mole) of triethylamine. One continues to agitate for 2 hours while allowing the temperature to climb to that of the surroundings; one filters the liquid then evaporates off the cyclohexane under reduced pressure. One obtains trichloromethanesulphenyl-benzimidazole under the appearance of an amber oil which gradually congeals into a yellow solid with a waxy consistency.

Operating in an analogous way one can, in particular, prepare the following compounds:
   Trichloromethanesulphenyl-1-methyl-5-benzimidazole
   Trichloromethanesulphenyl-1-dimethyl-5,6-benzimidazole
   Trichloromethanesulphenyl-1-methoxy-5-benzimidazole
   Trichloromethanesulphenyl-1-chloro-5-benzimidazole
   Trichloromethanesulphenyl-1-dichloro-5,6-benzimidazole By replacing perchloromethylmercaptan with other sulphenyl halides one can, in particular, prepare the following compounds:
   Dichlorofluoromethanesulphenyl-1-benzimidazole
   Chlorodifluoromethanesulphenyl-1-benzimidazole
   (Trichloro-1,1,2-ethanesulphenyl)-1-benzimidazole
   (Tetrachloro-1,1,2,2-ethanesulphenyl)-1-benzimidazole
   (Tetrachloro-1,2,2,2-ethanesulphenyl)-1-benzimidazole
   (Dichloro-1,2ethylenesulphenyl)-1-benzimidazole
   (Trichloro-1,2,2-ehtylenesulphenyl)-1-benzimidazole

EXAMPLE 5

Into 3.5 liters of toluene one introduces successively 146 g. (1 mole) of ethyl-2-benzimidazole then a solution containing 54 g. (1 mole) of sodium methoxide in 200 ml. of methanol; one distills, under normal pressure, the toluene/methanol azeotrope until total disappearance of the methanol. One cools to about 0° C. then adds 186 g. (1 mole) of perchloromethylmercaptan while agitating and continuing to cool to maintain in the region of 0° C.; one agitates thus for a further 2 hours then filters off the liquid; the toluene is evaporated off under reduced pressure to give trichloromethanesulphenyl-1-ethyl-2-benzimidazole in the form of yellowish-white crystals slippery to the touch (m.p. = 72° C.).

Operating in an analogous way one can, in particular, prepare the following compounds:
   Trichloromethanesulphenyl-1-methyl-2-benzimidazole
   Trichloromethanesulphenyl-1-chloro-5-methyl-2-
     benzimidazole
   Trichloromethanesulphenyl-1-propyl-2-benzimidazole
   Trichloromethanesulphenyl-1-isopropyl-2-benzimidazole
   Trichloromethanesulphenyl-1-trichloromethyl-2-
     benzimidazole
   Trichloromethanesulphenyl-1-trifluoromethyl-2-
     benzimidazole
   Trichloromethanesulphenyl-1-dichloro-4,5-
     trifluoromethyl-2-benzimidazole

EXAMPLE 6

Into 2 liters of dry benzene one introduces 163 g. (1 mole) of nitro-5-benzimidazole and 101 g. (1 mole) of triethylamine; one cools to about 5° C. then, while agitating and continuing to cool, one adds slowly 186 g. (1 mole) of perchloromethylmercaptan in solution in 1 liter of benzene; the liquid turns gradually to an orange-yellow; one agitates for a further hour then passes over a filter; one evaporates off the benzene under reduced pressure and obtains trichloromethanesulphenyl-1-nitro-5-benzimidazole in the form of an oil congealing rapidly into a golden-yellow crystalline mass (m.p. = 103°–105° C.).

Operating in an analogous way, one can, in particular, prepare the following compound:
   Trifluoromethanesulphenyl-1-chloro-6-nitro-4-
     benzimidazole

EXAMPLE 7

Into 1.5 liter of dry benzene one puts in suspension 194 g. (1 mole) of phenyl-2-benzimidazole then adds, in about 15 minutes and while agitating, 186 g. (1 mole) of perchloromethylmercaptan in solution in 500 ml. of benzene; one cools to about 5° C. then, while continuing to agitate and to cool, one adds little by little 101 g. (1 mole) of triethylamine in solution in 500 ml. of benzene; one agitates for a further 2 hours then passes over a filter; the benzene is evaporated off under reduced pressure; the residue is washed with 500 ml. of pentane and dried; one obtains trichloromethanesulphenyl-1-phenyl-2-benzimidazole in the form of a floury powder of a creamy-white color (m.p. = 142° C.).

Operating in an analogous way one can, in particular, prepare the following compounds:
   Trichloromethanesulphenyl-1-(chloro-2-phenyl)-2-
     benzimidazole
   Trichloromethanesulphenyl-1-(fluoro-2-phenyl)-2-
     benzimidazole
   Trichloromethanesulphenyl-1-chloro-5-phenyl-2-
     benzimidazole
   Trichloromethanesulphenyl-1-methyl-5-phenyl-2-
     benzimidazole
   Trichloromethanesulphenyl-1-methoxy-5-phenyl-2-
     benzimidazole By replacing the perchloromethylmercaptan with other sulphenyl halides one can, in particular, prepare the following compounds:
   Dichlorofluoromethanesulphenyl-1-benzimidazole
   Chlorodifluoromethanesulphenyl-1-benzimidazole
   (Trichloro-1,1,2-ethanesulphenyl)-1-benzimidazole
   (Tetrachloro-1,1,2,2-ethanesulphenyl)-1-benzimidazole
   (Tetrachloro-1,2,2,2-ethanesulphenyl)-1-benzimidazole
   (Dichloro-1,2-ethylenesulphenyl)-1-benzimidazole
   (Trichloro-1,2,2-ethylenesulphenyl)-1-benzimidazole

EXAMPLE 8

In 2.5 liters of dry benzene one puts in suspension 275 g. (1 mole) of (Quinolyl-8)-oxymethyl)-2-benzimidazole; one cools to about 5° C. and, while agitating, one adds 186 g. (1 mole) of perchloromethylmercaptan in about 1 hour; one continues to cool and to agitate and adds 101 g. (1 mole) of triethylamine in about 1 hour; one maintains for a further 30 minutes at about 5° C. then, without stopping agitation, one ceases the cooling and allows the temperature to rise to that of the surroundings; one maintains thus for 2 hours then passes over a filter; one evaporates off the benzene under reduced pressure without exceeding 25° C.; one washes the residue several times with pentane and dries in a stream of dry air. One obtains trichloromethanesulphenyl-1-(Quinolyl-8)-oxymethyl)-2-benzimidazole in the form of a greenish crystalline powder decomposing without melting above 150° C.

Operating in an analogous way one can, in particular, prepare the following compounds:
   Trichloromethanesulphenyl-1-(chloro-5-quinolyl-8)-ox-
     ymethyl-2-benzimidazole
   Trichloromethanesulphenyl-1-(methyl-6-quinolyl-8)-ox-
     ymethyl-2-benzimidazole
   Trichloromethanesulphenyl-1-(dibromo-5,7-quinolyl-8)-
     oxymethyl-2-benzimidazole
   Trichloromethanesulphenyl-1-(nitro-5-quinolyl-8)-ox-
     ymethyl-2-benzimidazole Trichloromethanesulphenyl-1-dichloro-5,6-(quinolyl-8)-
oxymethyl-2-benzimidazole
Trichloromethanesulphenyl-1-dimethyl-5,6n-(quinolyn-8)-
oxymethyl2-benzimidazole
Trichloromethanesulphenyl-1-methoxy-5-(quinolyl-8)-ox-
ymethyl-2-benzimidazole By replacing perchloromethylmercaptan by other sulphenyl halides, one can, in particular, prepare the following compounds:

Dichlorofluoromethanesulphenyl-1-(quinolyl-8)-ox-
ymethyl-2-benzimidazole
Chlorodifluoromethanesulphenyl-1-(quinolyl-8)-ox-
ymethyl-2-benzimidazole
(Trichloro-1,2,2-ethanesulphenyl)-1-(quinolyl-8)-ox-
ymethyl-2-benzimidazole
(Tetrachloro-1,1,2,2-ethanesulphenyl)-1-(quinolyl-8)-ox-
ymethyl-c 2-benzimidazole
(Tetrachloro-1,2,2,2 -ethanesulphenyl)-1-(quinolyl-8)-ox-
ymethyl)-2-benzimidazole
(Dichloro-1,2-ethylenesulphenyl-1-(quinolyl-8)-ox-
ymethyl-2-benzimidazole
(Trichloro-1,2,2-ethylenesulphenyl-1-(quinolyl-8-ox-
ymethyl-2-benzimidazole

EXAMPLE 9

Into 6 liters of chloroform, one introduces 310 g. (1 mole) of bis-(benzimidazolyl-2)-1,4-benzene; one cools to 0° C. and adds in about 30 minutes 186 g. (1 mole) of perchloromethylmercaptan; one continues to cool and adds, slowly and with good agitation, 101 g. (1 mole) of triethylamine; one allows the temperature to return to that of the surroundings and agitates thus for 2 hours; one washes three times with a liter of iced water and dries on sodium sulfate; one filters and evaporates the chloroform under reduced pressure; the residue is washed with cyclohexane and dried in a stream of dry air. One obtains N-(trichloromethanesulphenyl)-bis-(benzimidazoyl-2)-1,4-benzene in the form of a crystalline powder of a white-ochre color decomposing without melting above 180° C.

Operating in an analogous way with 155 g. (0.5 mole) of bis-(benzimidazolyl-2)-1,4-benzene, one obtains bis-(trichloromethanesulphenyl-1-benzimidazolyl-2)-1,4-benzene in the form of a yellowish powder decomposing without melting above 125° C.

Likewise can be obtained, in particular, the N-trichloromethanesulphenylated and N,N'-bis-trichoromethanesulphenylated compounds of the following bis-benzimidazoles:

bis-(benzimidazolyl-2)1,2-ethylene
bis-(benzimidazolyl-2-)-2,5-pyridine
bis-(benzimidazolyl-2)-2,5-furan
bis-(benzimidazolyl-2)-1,6-hexane
bis-(benzimidzolyly-2)-1,2-benzene
bis-(benzimidazolyl-2)-1,10-decane
bis-(methoxy-5-benzimidazolyl-2)-1,1-ethane
(Dimethyl-5,6-benzimidazolyl-2)-methyl-2-methoxy-5-
benzimidazole

EXAMPLE 10

In a mixture consisting of a liter of water and 500 ml. of acetone, one dissolves 133 g. (1 mole) of methyl-5benzotriazole; one adds, while agitating, a solution containing 50 g. (1.25 mole) of caustic soda in 250 ml. of water; one leaves to stand overnight; the next day one separates, by centrifugal suction filtering, the sodium derivative which has precipitated in a practically quantitative quantity; one repastes with 250 ml. of acetone, suction filters again and dries under reduced pressure at about 35°–40° C.

The sodium derivative is introduced into 2 liters of dioxan and subjected to a vigorous agitation; one adds, in about 30 minutes, 186 g. (1 mole) of perchloromethylmercaptan in solution in a liter of dioxan; one notes a rise in temperature of 90° C.; one continues to agitate for 2 hours then eliminates the sodium chloride by filtering; the dioxan is evaporated off under reduced pressure and the residue is dried in a stream of dry air for several hours. One obtains methyl-5N-(trichloromethanesulphenyl)-benzotriazole in the form of a solid yellowish product of waxy consistency.

Operating in an analogous way one can, in particular, prepare the following compounds:

Dimethyl-5,6N[trichloromethanesulphenyl]-benzo
Dichloro-5,6N-(trichloromethanesulphenyl)-benzotriazole
Tetrachloro-4,5,6,7N-(trichloromethanesulphenyl)-
benzotriazole
Methyl-5-trifluoromethyl-6N-(trichloromethanesulphenyl)-
benzotriazole
Nitro-5N-(trichloromethanesulphenyl)-benzotriazole
Chloro-6-nitro-4N-(trichloromethanesulphenyl)-
benzotriazole By replacing perchloromethylmercaptan with other sulphenyl halides one can, in particular, prepare the following compounds:

Methyl-5N-(trichloro-1,2,2-ethanesulphenyl)-
benzotriazole
Methyl-5N-(tetrachloro-1,1,2,2-ethanesulphenyl)-
benzotriazole
Methyl-5N-(tetrachloro-1,2,2,2-ethanesulphenyl)-
benzotriazole
Methyl-5N-(dichloro-1,2-ethylenesulphenyl)-benzotriazole
Methyl-5N-(trichloro-1,2,2-ethylenesulphenyl)-
benzotriazole

EXAMPLE 11

Into 2 liters of dry benzene one introduces 129 g. (1 mole) of the N-sodium derivative of indole; one cools to about 5° C. and, while agitating, one sends a stream of nitrogen above the solution; one then introduces 186 g. (1 mole) of perchloromethylmercaptan in solution in 500 ml. of benzene; the speed of addition and the cooling are regulated to maintain the reaction medium at a temperature in the region of 5° C.; one then continues to agitate for 1 hour under a stream of nitrogen and allows the temperature to return to 15° C.; one eliminates the sodium chloride by rapid filtering and evaporates off the solvent under reduced pressure; one washes the residue with a little isopropyl oxide and dries in vacuo. One thus obtains trichloromethanesulphenyl-indole in the form of a red powder turning little by little to black when one exposes it to the air.

Operating in an analogous way one can, in particular, prepare the following compounds:

Methyl-3-trichloromethanesulphenylindole
Cyanomethyl-3-trichloromethanesulphenylindole
Phenyl-2-trichloromethanesulphenylindole
Dibromo-2,6-methyl-3-trichloromethanesulphenylindole
Benzylidene-3-trichloromethanesulphenyl-1-indolinone-2
(Nitro-5-furfurylidene)-3-trichloromethanesulphenyl-1-in-
dolinone-2
Dichloro-5,6-(nitro-5-furfurylidene)-3-
trichloromethanesulphenyl-1-indolinone-2
fluoro-6-(nitro-5-furfurylidene)-3-
trichloromethanesulphenyl-1-indolinone-2

EXAMPLE 12

Into 2 liters of dry benzene, one introduces 147 g. (1 mole) of isatin in fine powder form and 101 g. (1 mole) of triethylamine; one cools to about 5° C. and, while agitating vigorously, one adds, in about 30 minutes and without exceeding 10° C., a solution containing 204 g. (1.1 mole) of perchloromethylmercaptan in 1 liter of benzene; one allows the temperature to rise to that of the surroundings and agitates for a further hour; one eliminates the triethylamine hydrochloride by filtering and evaporates off the benzene under reduced pressure; the crystalline residue is washed with a little pentane and dried in a stream of dry air. One obtains trichloromethanesulphenylisatin in the form of a golden yellow powder (m.p. =121° C.).

Operating in an analogous way one can, in particular, obtain the following compounds:
Bromo-5-trichloromethanesulphenylisatin
Dichloro-5,6-trichloromethanesulphenylisatin
Dinitro-5,7-trichloromethanesulphenylisatin
Fluoro-6-trichloromethanesulphenylisatin
triethoxy-4,5,6-trichloromethanesulphenylisatin
Chloro-5-dimethoxy-6,7-trichloromethanesulphenylisatin By replacing perchloromethylmercaptan by other sulphenyl halides, one can, in particular, obtain the following compounds:
(Trichloro-1,2,2-ethanesulphenyl)-1-isatin
(Tetrachloro-1,1,2,2-ethanesulphenyl)-1-isatin
(Tetrachloro-1,2,2,2-ethanesulphenyl)-1-isatin
(Trichloro-1,2,-ethylenesulphenyl)-1-isatin

EXAMPLE 13

Into 2 liters of dry benzene containing 39 g. (1 mole) of sodium amide in suspension, one introduces 199 g. (1 mole) of phenthiazine; one takes to reflux until the release of ammonium ceases; one cools to 5° C. and introduces, while agitating vigorously, 186 g. (1 mole) of perchloromethylmercaptan in solution in 1 liter of benzene, one takes care not to exceed a temperature of 10° C. during the introduction then subsequently allows the temperature to rise to that of the surroundings; one agitates at this temperature for 2 hours then passes over a filter; one washes the residue several times with benzene and combines the filtrates; one concentrates with 500 ml. of dry isopropyl oxide; one cools the whole to about 0° C. over a few hours and separates, by filtering, the product which has precipitated; one washes with isopropyl oxide and dries in vacuo. One obtains trichloromethanesulphenylphenothiazin in the form of a green crystalline powder (m.p. =90°-92° C.).

Operating in an analogous way one can, in particular, prepare the following compounds:
Chloro-2-trichloromethanesulphenylphenothiazin
Trifluoromethyl-2-trichloromethanesulphenylphenothiazin
Nitro-2-trichloromethanesulphenylphenothiazin
Trichloromethanesulphenylphenothiazin

EXAMPLE 14

One treats 147 g. (1 mole) of benzotriazin-1,2,3-one-4 with 40 g. (1 mole) of pure caustic soda in solution in 200 ml. of water; one adds 3 liters of toluene and eliminates the water by azeotropic distillation by causing the decanted toluene to return progressively with the distillation; one cools to about 10° C. and, while agitating vigorously, one introduces, in about 2 hours, 186 g. (1 mole) of perchloromethylmercaptan in solution in 500 ml. of toluene; one agitates again at room temperature for 2 hours then filters to eliminate the sodium chloride; the filtrate is treated with decoloring charcoal and filtered again; the toluene is evaporated off under reduced pressure and the residue is washed with a little cyclohexane. One obtains trichloromethanesulphenyl-3-benzotriazin-1,2,3-one-4 with the appearance of little orange crystals (m.p. = 150° C., dec.)

By replacing perchloromethylmercaptan with other sulphenyl halides one can, in particular, obtain the following compounds:
Dichlorofluoromethanesulphenyl-3-benzotriazin-1,2,3-one-4
(Tetrachloro-1,1,2,2-ethanesulphenyl)-3-benzotriazin-1,2,3-one-4
(Dichloro-1,2-ethylenesulphenyl)-3-benzotriazin-1,2,3-one-4
(Trichloro-1,2,2-ethylenesulphenyl)-3-benzotriazin-1,2,3-one-4

EXAMPLE 15

In 2 liters of benzene one puts in suspension 216 g. (1 mole) of pyromellitic diimide in very fine powder form and adds, in about 30 minutes, 223 g. (1.2 mole) of perchloromethylmercaptan. One then adds, in about 1 hour, 121 g. (1.2 mole) of triethylamine while agitating vigorously; one continues to agitate for 2 hours at room temperature then carries to reflux for 1 hour; one leaves till the next day then filters on a fritted plate; the residue is washed with a little cold benzene, dried in a stream of air, washed twice with 2 liters of iced water and dried. One obtains N-trichloromethanesulphenyl-benzenetetracarbon-1,2,4,5-diimide in the form of a creamy white crystalline powder (m.p. = 330° C., dec.).

By evaporating the benzene produced during the filtering one obtains a little of the N,N'-bis-(trichloromethanesulphenyl) derivative.

Operating in a similar manner one can, in particular, prepare the following compounds:
N-trichloromethanesulphenyl-benzenetetracarbon-1,2,3,4-diimide
N-trichloromethanesulphenyl-cyclohexanetetracarbon-1,2,4,5-diimide
N-trichloromethanesulphenyl-cyclopentanetetracarbon-1,2,3,4-diimide
N-trichloromethanesulphenyl-dichloro-3,6-benzenetetracarbon-1,2,4,5-diimide By replacing perchloromethylmercaptan with other sulphenyl halides one can, in particular, prepare the following compounds:
N-dichlorofluoromethanesulphenyl-benzenetetracarbon-1,2,4,5-diimide
N-(tetrachloro-1,1,2,2-ethanesulphenyl)-benzenetetracarbon-1,2,4,5-diimide
N-(tetrachloro-1,2,2,2-ethanesulphenyl)-benzenetetracarbon-1,2,4,5-diimide
N-(dichloro-1,2-ethylenesulphenyl)-benzenetetracarbon-1,2,4,5-diimide
N-(trichloro-1,2,2-ethylenesulphenyl)-benzenetetracarbon-1,2,4,5-diimide

EXAMPLE 16

Into 3 liters of benzene containing 558 g. (3 moles) of perchloromethylmercaptan one adds, in about 2 hours and while agitating, a suspension in 2 liters of benzene of 216 g. (1 mole) of pyromellitic diimide to which one has added 222 g. (2.2 moles) of triethylamine; the suspension is kept agitated throughout the introduction. One then heats the whole in such a way as to produce a reflux at the end of an hour and maintains this for 4 hours; one allows to cool and passes over a filter; the residue contains a little N-trichloromethanesulphenyl-benzenetetracarbon-1,2,4,5-diimide which is washed with water and dried as in example 15; the filtrate is subjected to an evaporation in vacuo in such a way as to drive off the whole of the benzene; the residue is agitated for 1 hour with 2 liters of pentane; one filters, washes the residue with a little fresh pentane and dries in a stream of dry air; one obtains N,N'-bis-(trichloromethanesulphenyl)-benzenetetracarbon-1,2,4,5-diimide in the form of a white-orange crystalline powder.

By evaporating off the pentane one receives the perchloromethylmercaptan in excess, which allows a few crystals of the preceding compound to form which one can separate by filtering and wash with a little pentane.

Operating in a similar manner one can, in particular, prepare the following compounds:
N,N'-bis-(trichloromethanesulphenyl)-benzenetetracarbon-1,2,3,4-diimide
N,N'-bis-(trichloromethanesulphenyl)-carbon-1,2,4,5-diimide
N,N'-bis-(trichloromethanesulphenyl)-cyclopentanetetracarbon-1,2,3,4-diimide
N,N'-bis-(trichloromethanesulphenyl)-dichloro-3,6-benzenetetracarbon-1,2,4,5-diimide By replacing perchloromethylmercaptan with other sulphenyl halides one can, in particular, prepare the following compounds:

N,N'-bis-(dichlorofluoromethanesulphenyl)-benzenetetracarbon-1,2,4,5-diimide

N,N'-bis-(tetrachloro-1,1,2,2-ethanesulphenyl)-benzenetetracarbon-1,2,4,5-diimide N,N'-bis-(dichloro-1,2-ethylenesulphenyl)-benzenetetracarbon-1,2,4,5-diimide N,N'-bis-(trichloro-1,2,2-ethylenesulphenyl)-benzenetetracarbon-1,2,4,5-diimide

What is claimed as the invention is:

1. A process for controlling fungus which comprises contacting said fungus with a fungicidally effective amount of trichloromethanesulphenylbenzimidazole.

2. A process for controlling fungus which comprises contacting said fungus with a fungicidally effective amount of trifluoromethanesulphenyl-1-chloro-6-nitro-4-benzimidazole.

3. A process for controlling fungus which comprises contacting said fungus with a fungicidally effective amount of ethyl-2-trichloromethane-sulphenylbenzimidazole.

4. A process for controlling fungus which comprises contacting said fungus with a fungicidally effective amount of trichloromethanesulphenylisatin.

* * * * *